United States Patent Office 3,825,502
Patented July 23, 1974

3,825,502
OLEFIN OXIDATION CATALYST
Shigeo Takenaka, Hitoshi Shimizu, and Kenichiro Yamamoto, Takasaki, Japan, assignors to Nippon Kayaku Co., Ltd., Tokyo, Japan
No Drawing. Filed Jan. 20, 1972, Ser. No. 219,558
Claims priority, application Japan, May 26, 1971, 46/35,501
Int. Cl. B01j 11/06, 11/32
U.S. Cl. 252—456
5 Claims

ABSTRACT OF THE DISCLOSURE

The present invention relates to a novel catalyst corresponding to the empirical formula:

$$Ni_aCo_bFe_cBi_dMe_eH_hMo_fO_g$$

wherein Me represents at least one element selected from the group of tin, magnesium, chromium, zinc, manganese titanium and tungsten, H represents at least one element selected from the group of potassium, rubidium and cesium, and $a$, $b$, $c$, $d$, $e$, $f$, $g$ and $h$ are numbers of atoms of Ni, Co, Fe, Bi, Me, Mo, O and H respectively, if more than two elements are preferred in the case of Me and H, $e$ and $h$ mean the total numbers of those elements, with the proviso that when $f$ is 12, $a$ is 0 to 6, $b$ is 0 to 20, $c$ is 0.5 to 8, $d$ is 0.1 to 7, $e$ is less than 3.0 excluding zero, $h$ is more than 0 and no more than 0.5, and $g$ is a number which is determined by the valence requirements of Ni, Co, Fe, Bi, Me, H, and Mo. $g$ is about 36 to 90. The catalyst of the invention is useful in oxidation of olefins, and in particular in the production of methacrolein or 1,3-butadiene and methacrolein simultaneously by the oxidation of olefin consisting of isobutylene or butene mixture containing isobutylene and n-butenes with molecular oxygen or air.

According to the present invention, the catalysts employed in a vapor phase oxidation increase the yield of methacrolein without excessive oxidation of olefins to undesired higher oxidation products of carbon such as carbon monoxide and carbon dioxide.

BACKGROUND OF THE INVENTION

Mnay of the catalysts for preparing methacrolein by oxidizing isobutylene have been previously disclosed. The catalysts which were composed of (1) tellurium oxide-molybdenum oxide system, resulted in a relatively good yield of methacrolein [in British Pat. No. 1,014,121 (1965, I.C.I), French Pat. No. 1,380,884 (I.C.I) and Japanese Patent Publications Nos. 3,562/1969 (Montecatini), 8,992/1969 (Mitsubishi Rayon) and 25,046/1969 (Toa Gosei)]. Another group (2) of catalysts containing iron, bismuth, phosphorus, molybdenum have been also disclosed for this process in U.S. Pat. No. 3,171,859, Japanese Patent Publications Nos. 2,324/1968 (Nippon Kayaku) and 22,526/1970 (Asahi Kasei). While the yields of methacrolein with the group (1) of catalyst containing tellurium are good in general, the life of those of group (1) is very short. It is also disadvantageous for industrial viewpoint that these catalysts contain the amount of 10–20% of expensive tellurium oxide.

The group (2) of catalysts containing bismuth-phosphorus-molybdenum and iron have a high activities as compared with another one, nevertheless, have an inferior selectivity for methacrolein.

According to the process of Japanese Patent Publications Nos. 2,324/1968, 16,602/1967 and 2,413/1967, with Bi-Mo system catalyst 95–98% of isobutylene fed to the reactor is consumed in a single pass over the catalyst and only 35–45% of the isobutylene consumed is converted to methacrolein and most of the remainder is converted to carbon di- and monoxide. The highest single pass yield of methacrolein based on the total isobutylene fed in Japanese Patent Publication No. 2,413/1967 is only 41%.

In the process of U.S. Pat. No. 3,171,859, about 50% of single pass yield is obtained, but its value is not satisfactory for commercial yield, comparing that high single pass yield of acrolein are obtained in the oxidation of propylene.

On the other hand, a process for the simultaneous preparation of methacrolein and 1,3-butadiene have been also disclosed in Japanese Patent Publication No. 7,881/1967. In this publication, the process carried out over a catalyst comprised of oxides of V, Bi and Mo, and the highest yield of 67% for methacrolein, but that of only 76% for 1,3-butadiene are obtained.

SUMMARY

According to the process of the present invention, the highest single pass yield of 1,3-butadiene from n-butenes under the proper operating conditions amounts to about 87% and that of methacrolein from isobutylene amounts to about 77%.

Prior to the oxidation of the single component of either n-butenes or iso-butylene, a purified single component of butene should be prepared by means of a physical or chemical separation of isobutylene from n-butenes. At present, industrial sources for butenes are provided from $C_4$ fractions formed in petroleum naphtha cracking and residue obtained by extracting out 1,3-butadiene from the $C_4$ fractions. This residue, however, still contains four butenes (i.e. isomers of butene-1, cis-2-butene, trans-2-butene and isobutylene) which are quite similar to each other in both physical and chemical properties and, therefore, separation and purification of a desired component are not easy and thus single component of butenes is too expensive to be used as industrial starting material.

The products obtained by the process of the present invention are mainly composed of 1,3-butadiene and methacrolein with a boiling point of 40° C. and 68° C., respectively and, therefore, the separation of these products can be done easily by a simple physical operation.

When the mixture of different butenes is used as starting materials, the four butenes are generally different from each other in reactivity, the order being, isobutylene>butene-1>cis-2-butene>trans-2-butene. In the presence of the catalyst according to the present invention, the optimum reaction temperatures of at least the main components, n-butenes, particularly, butene-1 and isobutylene is nearly the same. This is a great advantage that nearly the same temperature can be preferred in the simultaneous reaction to obtain same conversions. It means that no limitation is made in mixing ratio of starting olefins and that the mixture of said two butenes in any proportion can be used. It is also advantageous in a reaction wherein starting materials are circulated, and this is quite significant from industrial viewpoint.

It is another advantage that the addition of the elements Me decreases in the temperature of oxidations. In the present catalyst, 280–390° C. of the salt bath temperature is preferred, which is lower by 30–50° C. than in the prior one.

DETAILED DESCRIPTION

The use of the catalyst of this invention will be now considered in more detail.

The process of this invention will be now considered in more detail in regard to the specific desired products, namely, methacrolein and 1,3-butadiene. In the present specification the following definitions are employed:

Conversion percent
$$= \frac{\text{Mols of isobutylene or n-butenes converted}}{\text{Mols of isobutylene or n-butenes fed}}$$

Selectivity to methacrolein percent
$$= \frac{\text{Mols of methacrolein obtained}}{\text{Mols of isobutylene converted}}$$

Selectivity to 1,3-butadiene percent
$$= \frac{\text{Mols of 1,3-butadiene obtained}}{\text{Mols of n-butenes converted}}$$

Singe Pass Yield of 1,3-butadiene or methacrolein percent
$$= \frac{\text{Mols of 1,3-butadiene or methacrolein}}{\text{Mols of n-butenes or isobutylenefed}}$$
$$= \text{Conversion} \times \text{Selectivity}$$

The useful catalyst in the process of the present invention is composed from mixture compound or complex made up of the oxides of nickel and/or cobalt, iron, bismuth, molybdenum, elements represented by Me and H. The composition is conveniently expressed in the empirical formula mentioned above.

Of the above compositions, suitable preferred catalysts are given, when $f$ is 12, $a$ is 0–5, $b$ is 1–15, $c$ is 1–6, $d$ is 1–5, $e$ is less than 3.0 excluding zero, $g$ is 40–80 and $h$ is more than 0 and no more than 0.5. And moreover, more suitable ones are obtained, when $f$ is 12, $a$ is 0–5, $b$ is 2–12, $c$ is 1–5, $d$ is 1–5, $e$ is less than 3.0 excluding zero, $g$ is 40–70 and $h$ is more than 0 and no more than 0.2.

Among the elements Me mentioned above, suitable elements are magnesium and chromium.

The catalyst of this invention is usually prepared by adding aqueous solution of the suitable water-soluble salt of nickel, cobalt, iron and bismuth, the group of H and Me compounds to aqueous solution of suitable molybdate such as ammonium molybdate. The resulting slurry is then heated with a carrier. The solid cake which is formed by removing water is then calcined at an elevated temperature in the air or oxygen stream. Molybdenum oxide, or molybdic acid may be suitably used in place of ammonium molybdate. Suitable water-soluble salts for the preparation of the catalysts of this invention are nickel nitrate, cobalt nitrate, ferric nitrate, potassium nitrate and bismuth nitrate. For the group of Me, tin chloride, zinc nitrate, magnesium nitrate, ammonium chromate, ammonium para-tungstate etc. are preferably used. The catalyst embodied herein is particularly effective when deposited upon a carrier. Suitable carriers include silica, silicon carbide and alumina, and the silica gel or sol is particularly effective.

Catalysts are used in many solid physical forms such as grain and pellets. The catalyst of this invention is suitable for use in a fixed, fluidized, or moving bed reactor. The catalytic oxidation process of this invention is carried out at a temperature of from 250 to 500° C., preferably 280 to 390° C., and under a pressure of from 0.5 to 10 atmospheres absolute. In the oxidation of isobutylene and/or n-butenes, the contact time of feed gaseous mixture of air and isobutylene and/or n-butenes with the catalyst is usually preferred from 0.1 to 12 seconds and preferably from 0.5 to 8 at real temperature and pressure.

The feed for the processes usually requires the presence of from 0.5 to 4.0 mols, preferably 1.6 to 3.0 mols, of oxygen in the form of air per mol of olefin consisting of isobutylene or butene mixture containing n-butenes and isobutylene. Water in the form of steam is fed to the reactor along with the gaseous mixture of said olefin and air. The mole ratio of water per mol of olefin may be in the range of 1 to 20, and a ratio of 2 to 6 is preferred. A large volume of water in the feed effects a dilution and removal of the reaction heat, but little of water need be employed if the heat can be efficiently removed as in a molten potassium nitrate salt, or in a fluidized solid bath. When olefin is used as butene mixture in the present invention, the more the ratio of n-butenes is high, the more the single pass yield of methacrolein is high.

The process of the present invention is further illustrated by the following example.

EXAMPLE 1

87 grams of cobalt nitrate and 45 grams of ferric nitrate were dissolved in 80 ml. of distilled water respectively. 0.25 grams of potassium nitrate, 9.6 grams of magnesium nitrate and 18 grams of bismuth nitrate with a small amount of conc. nitric acid were dissolved in about 30 ml. of water. All of foregoing solution were added to the aqueous solution of 80 grams of ammonium molybdate. In the slurry, about 23 grams of silica gel (fine powder) were suspended. The resulting slurry was dried and then heated to 250° C. The resulting mass was pulverized, formed to a suitable size and calcined at 700° C. for 6 hours in the air.

The composition of the catalyst was represented by the following formula:

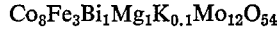

$$Co_8Fe_3Bi_1Mg_1K_{0.1}Mo_{12}O_{54}$$

120 ml. of the catalyst obtained above were filled in a reactor with 21 mm. in diameter dipped in a salt bath which was maintained at 330 to 340° C. Olefin used as a starting material was composed of 0.5 mol fraction of butene-1 (98.0% of purity, and additional 2% of butene-2) and 0.5 mol fraction of isobutylene (97.2% of purity and additional 2.5% of butanes). The gaseous mixture of this olefin, air and steam in the molar ratio of 1:2.2:6.5 was passed over the catalyst at the contact time of 5 seconds.

The result was given as follows:

| | Percent |
|---|---|
| Conversion of isobutylene | 96.5 |
| Single Pass Yield of methacrolein | 77.2 |
| Single Pass Yield of methacrylic acid | 2.9 |

Conversions of isobutylene to undesired higher oxidation products of CO and $CO_2$ were only 2.1 and 4.5%, respectively. 1,3-butadiene was simultaneously produced with a yield of 85% based on butene-1 fed.

COMPARATIVE EXAMPLE 1

A catalyst was prepared in the same procedure as the Example 1 except that magnesium was not contained in the catalyst, that is to say, $e$ in Me was made zero. The reaction was carried out nearly the same as in that of Example 1. A higher temperature of 370–380° C. of salt bath was preferred to achieve the same conversion as Example 1. The catalyst composition is

$$Co_8Fe_3Bi_1K_{0.4}Mo_{12}O_{55}$$

The result of oxidation was shown as follows:

| | Percent |
|---|---|
| Conversion of isobutylene | 94.5 |
| Single Pass Yield of methacrolein | 67.5 |
| Single Pass Yield of methacrylic acid | 3.0 |

The including of magnesium oxide in the catalyst composition produces a very high yield of methacrolein from isobutylene. 1,3-butadiene was simultaneously produced with a yield of 83% based on butene-1 fed.

EXAMPLES 2–8

Examples with some variations of reactions, in regard to temperature and pressure, were tried in the following Table. Catalyst and the molar ratio of feed gas were the same as Example 1.

TABLE 1

| Example number: | Reaction conditions | | | Conv., percent | | Single pass yield, percent | | |
|---|---|---|---|---|---|---|---|---|
| | Temp. (° C.) | Press. (atm. abs.) | Contact time (sec.) | Iso-butyl-ene | Butene-1 | Meth-acrolein | Meth-acrylic acid | 1,3-buta-diene |
| 2 | 310 | 1 | 5.1 | 89.1 | 91.2 | 69.8 | 2.0 | 82.8 |
| 3 | 280 | 1 | 8.3 | 90.8 | 93.5 | 70.3 | 2.5 | 83.6 |
| 4 | 350 | 1 | 4.6 | 95.4 | 96.6 | 73.0 | 2.0 | 87.0 |
| 5 | 390 | 1 | 3.9 | 96.2 | 98.2 | 74.4 | 2.8 | 86.5 |
| 6 | 300 | 1 | 7.0 | 92.3 | 93.5 | 72.4 | 2.5 | 84.2 |
| 7 | 330 | 1.5 | 5.5 | 96.6 | 96.8 | 75.2 | 3.3 | 86.3 |
| 8 | 330 | 3.4 | 6.2 | 98.5 | 98.2 | 72.8 | 3.5 | 86.7 |

NOTE.—Catalyst composition $Co_8Fe_3Bi_1Mg_1K_{0.1}Mo_{12}O_{54}$.

EXAMPLES 9–17

The catalysts having the composition shown in Table 2 were produced by a procedure similar to that described in Example 1. A mixed butene which was composed of isobutylene and butene-1 similar to that of Example 1 was used as olefins. The feed gas of olefins, air and steam in the molar ratio of 1:2.2:6.5 were passed over the catalyst at the contact time of 5 seconds.

Temperatures of the salt bath were also given in this Table.

EXAMPLE 29

A catalyst was prepared by the same composition and procedure as that of Example 1. The gaseous mixture of a typical spent butanes-butenes fraction, air and steam in

TABLE 2

| Example number | Catalysts compositions | Bath temp. (° C.) | Conv., percent | | Single pass yield, percent | | |
|---|---|---|---|---|---|---|---|
| | | | Iso-butene | Butene-1 | Metha-crolein | Metha-crylic acid | 1,3-buta-diene |
| 9 | $Co_8Fe_3Bi_1K_{0.07}Mg_{1.5}Mo_{12}O_{53}$ | 340 | 96.0 | 96.5 | 76.5 | 2.2 | 86.8 |
| 10 | $Co_8Fe_5Bi_1K_{0.07}Mg_{2.0}Mo_{12}O_{59}$ | 325 | 95.5 | 96.0 | 74.8 | 2.5 | 85.4 |
| 11 | $Co_8Fe_3Bi_1K_{0.07}Mg_{0.5}Mo_{12}O_{56}$ | 355 | 94.8 | 95.2 | 70.3 | 3.2 | 84.4 |
| 12 | $Co_8Fe_1Bi_1K_{0.07}Mg_{1.0}Mo_{12}O_{54}$ | 350 | 95.0 | 96.9 | 71.4 | 2.5 | 85.2 |
| 13 | $Co_8Fe_5Bi_1K_{0.07}Mg_{1.0}Mo_{12}O_{61}$ | 325 | 96.2 | 97.3 | 76.8 | 2.3 | 86.5 |
| 14 | $Ni_{2.5}Co_{4.5}Fe_{3.0}Bi_1K_{0.07}Mg_1Mo_{12}O_{52}$ | 320 | 95.5 | 96.5 | 69.8 | 3.4 | 83.8 |
| 15 | $Ni_{1.0}Co_{6.5}Fe_{3.0}Bi_1K_{0.07}Mg_1Mo_{12}O_{53}$ | 330 | 96.2 | 96.4 | 68.5 | 2.9 | 84.7 |
| 16 | $Co_{12}Fe_3Bi_1K_{0.07}Mg_1Mo_{12}O_{59}$ | 320 | 95.5 | 96.8 | 70.2 | 2.5 | 82.1 |
| 17 | $Co_{15}Fe_3Bi_1K_{0.1}Mg_1Mo_{12}O_{62}$ | 320 | 96.3 | 97.0 | 68.6 | 2.8 | 82.4 |

EXAMPLES 18–21

Catalysts of the same compositions as Example 1 except that various numbers of atom of chromium were included instead of magnesium in the catalyst were prepared. Reaction conditions were also same as the foregoing Examples of 9–17 except for bath temperature. Results of reactions were shown in Table 3.

the molar ratio of 1:20:6.5 was passed over the catalyst at the contact time of about 5 seconds. The spent butanes-butenes fraction in the instant example contains 27.5% of butene-1, 48.1% of isobutylene, 8.6% of trans-2-butene, 5.6% of cis-2-butene and additional about 9.0% of butanes. The temperature of salt bath was preferred in

TABLE 3

| Example number: | Catalysts compositions | Conv., percent | | Single pass yield, percent | | |
|---|---|---|---|---|---|---|
| | | Iso-butylene | Butene-1 | Metha-crolein | Metha-crylic acid | 1,3-buta-diene |
| 18 | $Co_8Fe_2Bi_1K_{0.07}Cr_1Mo_{12}O_{53}$ | 94.0 | 95.5 | 73.3 | 2.8 | 85.9 |
| 19 | $Co_8Fe_5Bi_1K_{0.07}Cr_{0.5}Mo_{12}O_{56}$ | 95.5 | 96.0 | 75.8 | 2.5 | 85.4 |
| 20 | $Co_8Fe_3Bi_1K_{0.07}Cr_{0.5}Mo_{12}O_{53}$ | 94.3 | 95.4 | 74.2 | 3.0 | 84.9 |
| 21 | $Co_8Fe_3Bi_1K_{0.07}Cr_{2.0}Mo_{12}O_{54}$ | 95.5 | 96.8 | 73.5 | 3.0 | 85.0 |

It may also be clear from comparison with comparative Example 1 that the inclusion of chromium in the catalysts embodied herein produces a high yield of methacrolein.

EXAMPLES 22–28

Catalysts with some variations of the compositions except for magnesium and molybdenum were prepared by the procedure of Example 1. Reaction conditions were same as the foregoing Examples except the reaction temperature. Results were given in the following Table.

the range of 330–335° C. Conversion of isobutylene and Single Pass Yields obtained here were shown as follows.

Percent
Conversion of isobutylene _____ 96.0
Single Pass Yield of methacrolein _____ 78.2
Single Pass Yield of methacrylic acid _____ 2.4

The catalyst of this invention had little or no activity against butenes contained in reagent gas fed.

Single Pass Yield of 1,3-butadiene produced was about 60% based on total of normal butenes fed.

TABLE 4

| Example number | Catalysts compositions | Bath temp. (° C.) | Conv., percent | | Single pass yield, percent | | |
|---|---|---|---|---|---|---|---|
| | | | Isobu-tylene | Butene-1 | Meth-acrolein | Meth-acrylic acid | 1,3-butadiene |
| 22 | $Co_8Fe_3Bi_1K_{0.02}Mg_1Mo_{12}O_{54}$ | 340 | 95.5 | 96.2 | 70.1 | 2.8 | 84.6 |
| 23 | $Co_8Fe_2Bi_1K_{0.2}Mg_1Mo_{12}O_{54}$ | 350 | 95.0 | 95.5 | 73.3 | 2.7 | 85.9 |
| 24 | $Co_8Fe_2Bi_1K_{0.5}Mg_1Mo_{12}O_{54}$ | 350 | 96.0 | 96.7 | 69.5 | 2.5 | 84.8 |
| 25 | $Co_{10}Fe_2Bi_{0.5}K_{0.05}Mg_1Mo_{12}O_{53}$ | 330 | 94.5 | 95.0 | 68.2 | 3.1 | 85.6 |
| 26 | $Co_7Fe_3Bi_2K_{0.07}Mg_1Mo_{12}O_{54}$ | 335 | 94.0 | 95.5 | 65.4 | 2.7 | 83.2 |
| 27 | $Ni_2Co_{10}Fe_2Bi_1K_{0.07}Mg_1Mo_{12}O_{60}$ | 320 | 95.0 | 96.2 | 70.4 | 2.5 | 86.1 |
| 28 | $Ni_5Co_5Fe_3Bi_1K_{0.08}Mg_1Mo_{12}O_{58}$ | 315 | 95.5 | 95.8 | 69.4 | 2.8 | 85.5 |

EXAMPLE 30

A catalyst was prepared in the same composition and manufacturing procedure of catalyst as in that of Example 1. The gaseous mixture of isobutylene alone, air and steam in the molar ratios of 1:2.2:6.5 was passed over the catalyst at the contact time of about 5 seconds and at 1 atmosphere pressure. This reaction is carried out at a temperature of 345° C. The result was given as follows:

|  | Percent |
|---|---|
| Conversion of isobutylene | 97.3 |
| Single Pass Yield of methacrylic acid | 3.5 |
| Single Pass Yield of methacrolein | 65.7 |

EXAMPLES 31–59

In these examples, each catalyst was prepared in the same procedure as the Example 1.

In Examples 40–59, these reactions were carried out nearly the same as that of Example 30 except reaction temperature. The reaction is carried out at a temperature of 280° C.–400° C.

| Ex. No. | Catalysts composition | Mol ratio of feed gas ($C_4H_3:O_2:H_2O$) | Reaction conditions Temp. (° C.) | Press. (atm.) | Conv. of isobutylene percent | Single pass yield, percent Metha-crolein | Meth-acrylic acid |
|---|---|---|---|---|---|---|---|
| 31 |  | 1:2.2:6.5 | 280 | 1 | 92.5 | 67.0 | 2.7 |
| 32 |  | 1:2.2:6.5 | 360 | 1 | 96.5 | 67.8 | 3.5 |
| 33 | $Co_8Fe_3Bi_1K_{0.1}Mg_1Mo_{12}O_{54}$ | 1:2.2:6.5 | 370 | 1 | 98.1 | 66.6 | 3.6 |
| 34 |  | 1:2.2:6.5 | 355 | 2.0 | 97.7 | 65.3 | 2.9 |
| 35 |  | 1:2.2:6.5 | 355 | 3.0 | 96.5 | 64.9 | 3.0 |
| 36 |  | 1:2.2:6.5 | 355 | 3.5 | 98.8 | 60.5 | 3.1 |
| 37 |  | 1:1.5:6.5 | 345 | 1 | 93.5 | 67.5 | 2.8 |
| 38 |  | 1:4.0:6.2 | 350 | 1 | 96.7 | 68.5 | 2.9 |
| 39 |  | 1:2.2:12.0 | 355 | 1 | 94.9 | 68.0 | 2.8 |

| Example number | Catalysts compositions | Conv. of isobutylene, percent | Single pass yield (percent) Meth-acro-lein | Meth-acrylic acid |
|---|---|---|---|---|
| 40 | $Co_8Fe_3Bi_1K_{0.07}Mg_{1.5}Mo_{12}O_{55}$ | 92.5 | 66.7 | 2.5 |
| 41 | $Co_8Fe_5Bi_5K_{0.07}Mg_{2.0}Mo_{12}O_{59}$ | 93.0 | 65.7 | 2.3 |
| 42 | $Co_8Fe_1Bi_1K_{0.1}Mg_1Mo_{12}O_{54}$ | 94.4 | 63.5 | 2.7 |
| 43 | $Co_8Fe_3Bi_1K_{0.1}Mg_{0.5}Mo_{12}O_{55}$ | 92.8 | 66.1 | 2.5 |
| 44 | $Ni_{2.5}Co_{4.5}Fe_3Bi_1K_{0.07}Mg_1Mo_{12}O_{52}$ | 94.5 | 65.5 | 2.6 |
| 45 | $Ni_{1.0}Co_{5.5}Fe_3Bi_1K_{0.07}Mg_1Mo_{12}O_{58}$ | 94.8 | 66.0 | 2.7 |
| 46 | $Co_{12}Fe_3Bi_1K_{0.07}Mg_1Mo_{12}O_{59}$ | 94.5 | 67.2 | 2.9 |
| 47 | $Co_{15}Fe_3Bi_1K_{0.1}Mg_1Mo_{12}O_{62}$ | 95.0 | 63.5 | 2.8 |
| 48 | $Co_8Fe_2Bi_1K_{0.07}Cr_1Mo_{12}O_{53}$ | 94.5 | 65.5 | 2.9 |
| 49 | $Co_8Fe_5Bi_1K_{0.07}Cr_{0.5}Mo_{12}O_{56}$ | 94.0 | 65.0 | 2.7 |
| 50 | $Co_8Fe_3Bi_1K_{0.07}Cr_{0.5}Mo_{12}O_{53}$ | 94.2 | 66.1 | 2.5 |

| Example number | Catalysts compostions | Conv. of isobutylene, percent | Single pass yield, percent Metha-crolein | Meth-acrylic acid |
|---|---|---|---|---|
| 51 | $Co_8Fe_3Bi_1K_{0.07}Cr_{2.0}Mo_{12}O_{54}$ | 96.0 | 64.8 | 2.9 |
| 52 | $Co_8Fe_3Bi_5K_{0.07}Cr_{1.0}Mo_{12}O_{58}$ | 95.6 | 64.5 | 2.9 |
| 53 | $Co_8Fe_3Bi_1K_{0.02}Mg_1Mo_{12}O_{55}$ | 96.0 | 66.2 | 2.8 |
| 54 | $Co_8Fe_2Bi_1K_{0.2}Mg_1Mo_{12}O_{54}$ | 95.5 | 65.0 | 2.7 |
| 55 | $Co_8Fe_2Bi_1K_{0.5}Mg_1Mo_{12}O_{54}$ | 93.7 | 64.4 | 2.7 |
| 56 | $Co_{10}Fe_2Bi_{0.5}K_{0.05}Mg_1Mo_{12}O_{58}$ | 94.0 | 65.5 | 2.9 |
| 57 | $Co_7Fe_3Bi_2K_{0.07}Mg_1Mo_{12}O_{54}$ | 93.5 | 63.9 | 3.0 |
| 58 | $Ni_2Co_{10}Fe_2Bi_5K_{0.07}Mg_1Mo_{12}O_{60}$ | 95.0 | 63.5 | 3.1 |
| 59 | $Ni_5Co_5Fe_3Bi_1K_{0.08}Mg_1Mo_{12}O_{58}$ | 94.5 | 64.0 | 3.0 |

We claim:

1. An olefin oxidation catalyst represented by the general formula:

$$Ni_aCo_bFe_cBi_dMe_eH_hMo_fO_g$$

in which Ni, Co, Fe, Bi, Mo and O respectively represent atoms of nickel, cobalt, iron, bismuth, molybdenum and oxygen, Me is at least one element selected from the group consisting of tin, chromium, zinc, manganese, titanium and tungsten, H represents at least one element selected from the group consisting of potassium, rubidium and cesium, $a$, $b$, $c$, $d$, $e$, $f$, $g$ and $h$ are respectively the number of atoms of Ni, Co, Fe, Bi, Me, Mo, O and H and when $f$ is 12, $a$ is 0 to 6, $b$ is 0 to 20, $c$ is 0.5 to 8, $d$ is 0.1 to 7, $e$ is less than 3 excluding zero, $h$ is more than 0 and no more than 0.5 and $g$ is 36 to 90.

2. A catalyst as claimed in claim 1, wherein $a$ is 0 to 5, $b$ is 1 to 15, $c$ is 1 to 6, $d$ is 1 to 5, $e$ is less than 3 excluding zero, $h$ is more than 0 and no more than 0.3, $f$ is 12 and $g$ is 40 to 80.

3. A catalyst as claimed in claim 1, wherein $a$ is 0 to 5, $b$ is 2 to 12, $c$ is 1 to 5, $d$ is 1 to 5, $e$ is less than 3 excluding zero, $h$ is more than 0 and no more than 0.2, $f$ is 12 and $g$ is 40 to 70.

4. A catalyst as claimed in claim 1 on a carrier.

5. A catalyst as claimed in claim 1, wherein the carrier is silica.

References Cited

UNITED STATES PATENTS

| 3,522,299 | 7/1970 | Takenaka et al. | 260—604 R |
| 3,576,764 | 4/1971 | Yamaguchi et al. | 252—437 |
| 3,716,496 | 2/1973 | Yoshino et al. | 252—456 X |
| 3,642,930 | 2/1972 | Grasselli et al. | 260—604 R |

CARL F. DEES, Primary Examiner

U.S. Cl. X.R.

252—467; 260—604 R